Oct. 31, 1961 M. F. KEATHLEY, SR., ET AL 3,006,512
MATERIAL DISPENSING MACHINE
Filed July 16, 1958 2 Sheets-Sheet 1
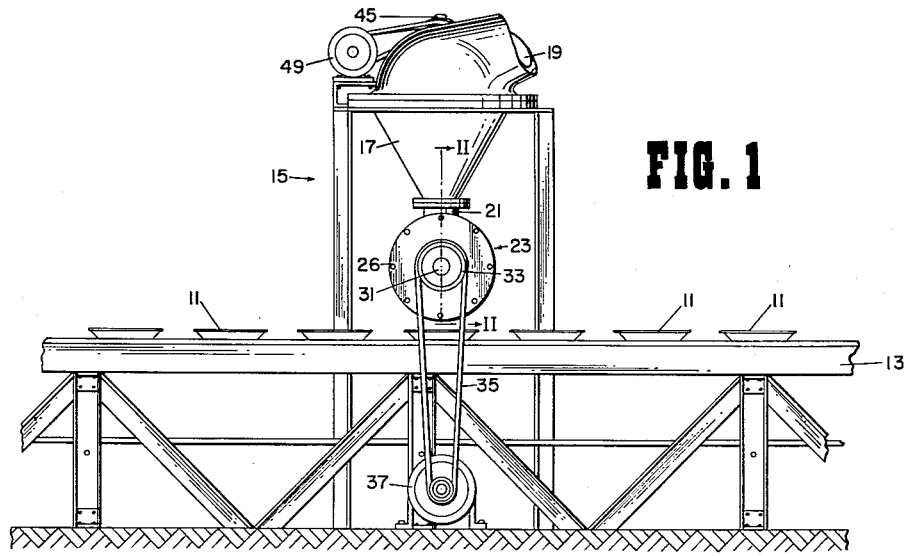
FIG. 1
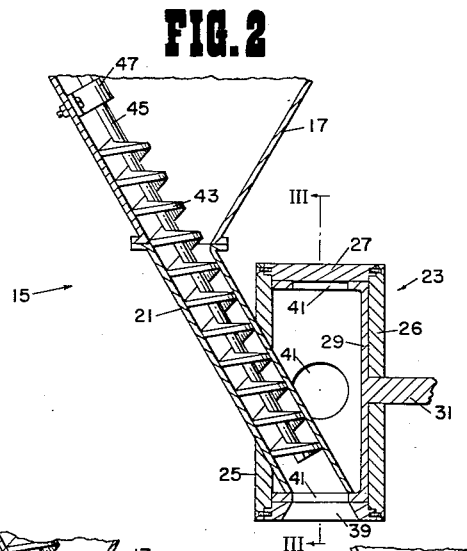
FIG. 2
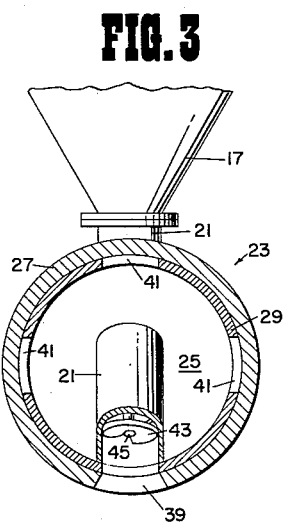
FIG. 3
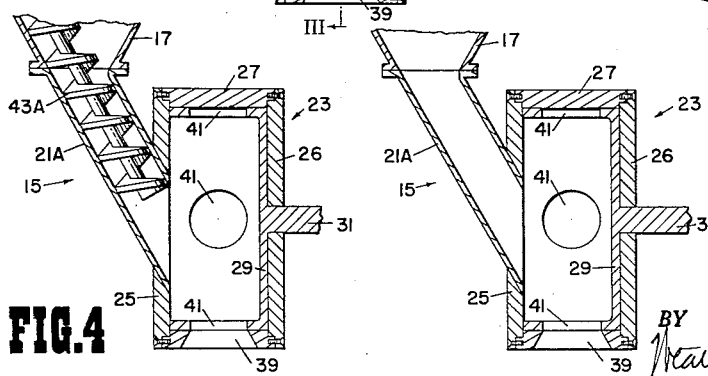
FIG. 4
FIG. 5
INVENTORS,
Maurice F. Keathley, Sr.
Robert O. Manspeaker
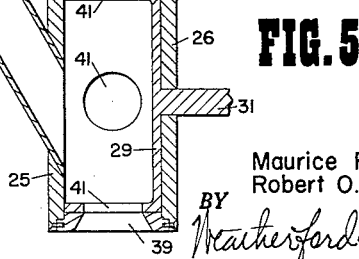
BY Weatherford & Weatherford
attys Oct. 31, 1961     M. F. KEATHLEY, SR., ET AL     3,006,512
MATERIAL DISPENSING MACHINE Filed July 16, 1958     2 Sheets-Sheet 2

INVENTORS,
Maurice F. Keathley, Sr.
Robert O. Manspeaker
BY
Weatherford & Weatherford
attys United States Patent Office 3,006,512
Patented Oct. 31, 1961

3,006,512
MATERIAL DISPENSING MACHINE
Maurice F. Keathley, Sr., and Robert O. Manspeaker, both of 2255 Young Ave., Memphis, Tenn.; said Manspeaker assignor to said Keathley
Filed July 16, 1958, Ser. No. 748,939
6 Claims. (Cl. 222—333)

This invention relates to certain new and useful improvements in means for dispensing materials, and is particularly adapted for the dispensing of material such as sugar, pie filling, meat, fruits and other similar materials in commercial bakeries.

In commercial bakeries, particularly in connection with the manufacture of pies, it is desirable to provide means for successively filling pie crusts or other forms with desired material in rapid succession. This desirable feature requires further that the dispensing be done with accuracy in order that the pie crusts may properly be filled with the materials to be dispensed thereinto and to avoid waste in such materials.

As many of the fillings for pies and the like are of relatively high viscosity difficulties have been heretofore encountered in attempts to handle mechanically such filling with any degree of accuracy. It is further apparent that while many such pie filling materials are of high viscosity, there are other materials of considerably lesser viscosity, and it accordingly is desirable to provide a mechanical means which is adapted to handle high viscosity materials and which is further adapted for conversion to the handling of those of lesser viscosity so as to provide a useful dispensing machine of substantially universal application.

The principal object of the present invention is to provide a new and novel material dispensing machine particularly adapted for the measured discharge of pie filling materials.

A further object of the invention is to provide in such a device which includes a hopper, a chute leading angularly from such hopper to communicate into a metering chamber comprising a substantially cylindrical section and a rotatable open cup journalled in the cylindrical section, the cup being circumferentially apertured for successive registry with a discharge port formed in the cylindrical housing.

A further object of the invention is to provide in such a device a rotary conveyor screw mounted in the diagonally disposed hopper chute.

A further object of the invention is to provide in such a device, a hopper chute which extends into the cylindrical housing and downwardly into sliding contact with the interior of the metering cup.

A further object of the invention is to provide in such a device, a conveyor screw which extends substantially throughout the length of the hopper chute.

A further object of the invention is to provide such a conveyor screw which extends into the cylindrical housing and into proximity with the discharge portion thereof; and A further object of the invention is generally to improve the design, construction and efficiency of material dispensing machines.

The means by which the foregoing and other objects of the present invention are accomplished and the manner of their accomplishment will be readily understood from the following specification upon reference to the accompanying drawings, in which:

FIG. 1 is a fragmentary front elevational view of a typical arrangement employing the present invention.

FIG. 2 is a fragmentary sectional view on an enlarged scale taken as on the line II—II of FIG. 1, illustrating a preferred embodiment of the invention.

FIG. 3 is a fragmentary sectional view taken as on the line III—III of FIG. 2.

FIG. 4 is a view similar to FIG. 2 illustrating a variation in the invention.

FIG. 5 is a further view similar to FIG. 2 illustrating a further variation in the invention.

Figure 6:
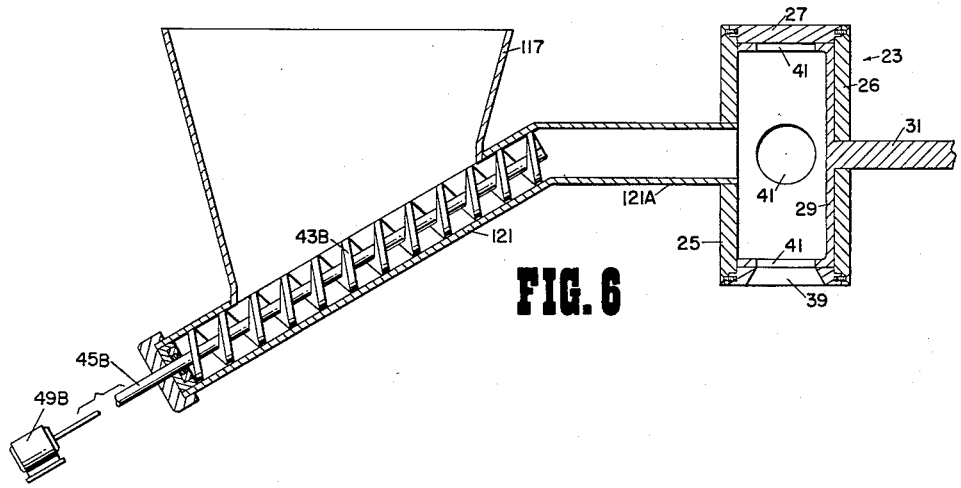
FIG. 6 is a further view similar to FIG. 2 illustrating a further variation in the invention.

Referring now to the drawings in which the various parts are indicated by numerals, the present invention is particularly adapted for employment in connection with an arrangement as of the type indicated in FIG. 1. As there shown, a series of pie crusts 11 are mounted upon a suitable conveyor 13 which is adapted to advance the pie crusts step by step successively beneath the discharge opening of the dispensing machine 15 of the present invention. Preferably (not here shown) the drive of the pie crust conveyor is synchronized with the drive of the dispensing machine in order successively to move the pie crusts 11 beneath the discharge opening to receive a metered amount of material to be discharged thereinto. It will, of course, be understood that the step by step advancement of the pie crusts beneath the dispensing machine may be otherwise accomplished as by successive hand placement or by successive advancement of a conveyor in other suitable manner.

Dispensing machine 15 preferably comprises a hopper 17 adapted for the receipt of materials to be discharged therebelow as onto pie crusts 11, hopper 17 being provided with an intake spout 19, spout 19 leading into hopper 17 from a suitable source of supply (not shown) by which the materials to be dispensed may be furnished in a constant flow, or intermittently, as conditions require. Connected into the lower end of hopper 17 is a diagonally disposed discharge chute 21 which is preferably disposed at an angle of substantially 60 degrees in order to enhance gravity discharge of materials from the hopper into the chute 21. At its lower end chute 21 communicates into a substantially cylindrical housing 23 which preferably comprises a rear wall 25, a front wall 26 and an annular wall 27, the walls 25, 26, 27 being rigidly secured together to provide a substantially cylindrical section. Rear wall 25 is apertured to receive chute 21 extending diagonally into the wall 25.

In the preferred embodiment of the device, as best shown in FIGS. 2 and 3, chute 21 is of a length to extend through the aperture in rear wall 25 into the interior of the cylindrical housing, and at its lower end to be engaged slidingly against the interior of a rearwardly open cup member 29. Cup member 29 is of circular cross section and is closely rotatably supported wihtin the cylindrical housing 23, being provided with a drive shaft 31 which extends forwardly through front wall 26 of cylindrical housing 23 and is adapted to receive a pulley or sprocket 33 for the purpose of driving the shaft 31 and cup member 29 connected thereto, the pulley or sprocket 33 being preferably engaged by a belt or chain 35 driven by a suitable motor 37. At its lower extremity cylindrical housing 23 is provided with a downwardly opening discharge aperture 39 which is formed through the lower portion of annular wall 27 and preferably opens downwardly therefrom and is somewhat flared outwardly as it downwardly extends, as best shown in FIGS. 2 to 5, inclusive. Cup member 29 is provided with a series of circumferentially spaced apertures 41, which in the present embodiment are illustrated as spaced apart at 90 degrees, but which it will be understood may be otherwise circumferentially equally spaced apart without departing herefrom. Apertures 41 in cup 29 are, pursuant to the rotation to cup 29 under drive of shaft 31 by motor 37, adapted to be successively moved into register with discharge aperture 39 in cylindrical housing 23 in order to enable the discharge from the interior of the housing and cup of material contained therein in measured content.

In the preferred embodiment of the invention chute 21 extends through the aperture in rear wall 25 inwardly and downwardly into the interior of cylindrical housing 23 and also inwardly and downwardly within cup member 29. In this embodiment of the invention the lower end of chute 21 is diagonally cut off in order that the lower end of the chute may slidingly and closely engage against the interior of cup member 29 adjacent to the apertures 41 therein, the diameter of the chute 21 being of sufficient length to embrace and extend approximately equal to the diameter of each of the apertures 41 in the cup 29. Thus it will be seen that material discharged downwardly through chute 21 is enabled to directly discharge into a cup aperture 41 as the same is moved into register with the lower end of the chute, and simultaneously when the same has moved into register with the lower end of the chute to discharge through discharge aperture 39 of housing 23. The condition just described is best illustrated in FIGS. 2 and 3 of the drawings.

Preferably the device within chute 21 incorporates a spiral screw conveyor 43 carried upon a shaft 45, shaft 45 being supported within hopper 17 by a suitable bracket 47 and extending upwardly into hopper 17 in parallelism with the side walls of chute 21, with the upper end of shaft 45 extending outwardly through the upper extremity of hopper 17 as shown in FIG. 1 where the shaft is engaged with a suitable variable speed drive arrangement by which it is connected for drive with a drive motor 49. Preferably screw conveyor 43 is of a length to extend from substantially within the confines of hopper 17 downwardly substantially throughout the length of chute 21 in order to impart its action to materials throughout a substantial length of the combination of the hopper and chute.

In the alternate forms of the device the screw shaft 45 may, as shown in FIG. 4, be shortened so as to terminate approximately at rear wall 25 of cylindrical housing 23, in which circumstance it is preferred that a modified chute 21A should be employed. As shown in FIGS. 4 and 5, modified chute 21A extends into the aperture in rear wall 25 and terminates in that aperture substantially flush with the inner surface of rear wall 25 and adjacent to the rearwardly open cup 29. In the embodiment as shown in FIG. 4, a minor section of screw conveyor 43A may be employed substituting for the screw conveyor 43 illustrated in FIGS. 2 and 3. Screw conveyor 43A preferably terminates at the extent of the shortened screw shaft as shown in FIG. 4, and terminates adjacent to the communication between chute 21A and the aperture in rear wall 25 communicating with the interior of cup member 29.

In other circumstances the device may be utilized as shown in FIG. 5, in which a chute 21A is incorporated, but in which the screw conveyor is omitted. It will be observed that as shown in FIG. 5 the chute 21A, as previously described, terminates at the interior of rear wall 25 at its point of communication with the interior of cup member 29.

In each instance the chute 21 and 21A extend downwardly from hopper 17 at a sharply inclined angle, and is communicated with the interior of cup member 29.

In the use of the device materials may be introduced into hopper 17 through intake spout 19 in preparedness for discharge therefrom into the chute, and thence into the cup and cylindrical housing arrangement.

In the preferred embodiment of the device, as shown in FIGS. 2 and 3, materials discharged into hopper 17 are kept under constant agitation upon drive of screw shaft 45 by motor 49 in order to prevent undesired packing of the materials within the hopper. The materials are constantly discharged from hopper 17 downwardly through chute 21 into the interior of cup member 29, the discharge being driven thereinto by the motivation of the screw conveyor 43. It will thus be seen that the material is kept under a substantially constant pressure by the motivation and operation of the screw conveyor 43, and that accordingly the materials are, in this embodiment of the invention, kept under a constant pressure downwardly into the interior of cup member 29 so as to be sharply expressed therefrom when an aperture 41 is moved into register with the lower end of chute 21 and simultaneously with discharge aperture 39 in cylindrical housing 23. Thus it will be seen that the drive of cup member 29 through shaft 31 by motor 37 accomplishes an effective valving for the purpose of metering the amount of discharge to be made from chute 21 through the registered apertures when this registery is accomplished by this drive. In this manner, highly viscous materials may simply and easily be handled by the device, insuring a discharge in exact proportions as desired of the materials through the registered apertures.

Under other circumstances, and with materials of slightly differing characteristics, it is desirable to employ the embodiment of the invention as particularly shown in FIG. 4, in which the screw conveyor 43A is employed, and which will serve upon its drive through motor 49 to maintain a constant pressure on the entire interior of rotatable cup 29. This arrangement is of particular value in respect with materials of somewhat less viscosity than the high viscosity materials referred to just above.

Under other circumstances where materials of relatively low viscosity are to be employed, the screw conveyors may be completely removed from the device and the device as particularly shown in FIG. 5 may be employed. Under circumstances of the use of this device the rotation of cup member 29 by the drive through motor 37 is effective to accomplish a gravity discharge of materials being handled by the device through the registered apertures in the cup and discharge aperture of the cylindrical housing.

In FIG. 6 a further variation in the invention is illustrated, which is particularly adaptable for usage with certain types of materials such as meat fillings and the like which are frequently used in commercial bakeries as pie fillers. In the arrangement as there shown, a somewhat modified hopper 117 is illustrated as communicating downwardly directly into a chute 121 which effectively houses and mounts a screw conveyor 43B substantially similar to the screw conveyors heretofore described.

Screw conveyor 43B is mounted upon a shaft 45B which is supported in chute 121 and which is adapted to be coupled to a motor 49B somewhat diagrammatically shown in FIG. 6. As shown in FIG. 6, screw conveyor 43B is inclined upwardly lying beneath the hopper 117, with the upper portion of chute 121 being open in communication with hopper 117 for the reception of material therefrom. Thus screw conveyor 43B is enabled to deliver the materials from hopper 117 along chute 121, the chute 121 including a substantially horizontally disposed chamber 121A which communicates with a cylindrical housing 23 like that already described.

Within the housing 23 a cup member 29 coupled to a shaft 31 is rotatably supported. It will be seen that the screw member 43B terminates substantially at the junction between the upwardly inclined portion of chute 121 and the horizontal chamber 121A. With this arrangement, similar to that shown in FIG. 4, the device is capable of delivering the material to be dispensed into the interior of the housing and cup member to maintain a pressure on the interior of the housing cup member, and to enable the discharge through the apertures formed in the housing and cup member for delivery of material to a pie crust or other form positioned therebelow.

Figure 7:
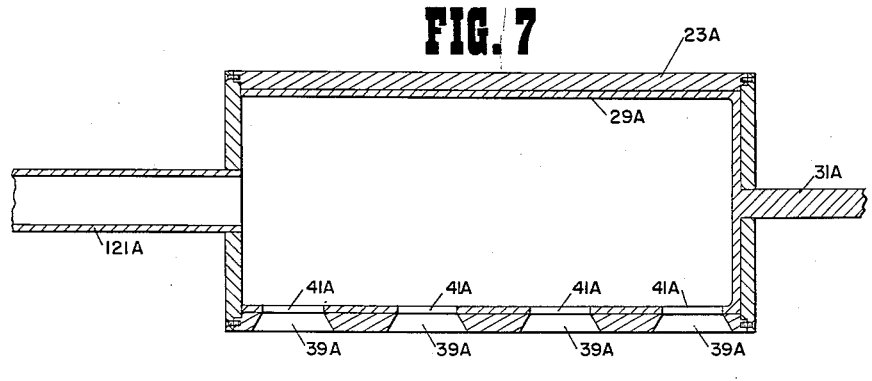
FIG. 7 is an additional fragmentary sectional view illustrating a further modification.

With the utilization of the device as shown in FIG. 6, it is found desirable sometimes to make variation in the cylindrical housing and the cup member in order to accommodate a plurality of pie crusts or other forms for simultaneous filling. In order so to do, as shown in FIG. 7, a cylindrical housing 23A is mounted in communication with chamber 121A. This housing is substantially elongated relative to the housings 23 discussed hereinabove and is provided with a series of spaced discharge ports 39A which are adapted for registry with selected series of apertures 41a formed in the wall of an elongated cup member 29A which is rotatably supported within housing 23a and is connected with a shaft 31A, the cup 29A being disposed with an open end facing toward the communication with horizontal chamber 121A, in order that materials discharged from chute 121 through chamber 121A are received into the interior of the cup rotatably mounted within the elongated housing 23A.

It will be seen that as the device is used, as shown in FIG. 7, a series of pie crusts or other forms may be moved beneath the discharge portion of the device, and that upon rotation of the cup member 29A the series of cup apertures 41A are moved into register with ports 39A in housing 23A, permitting multiple discharge of filler charges into the pie crusts or other forms therebeneath.

It will be understood that it is preferred that the screw flighting be extended upwardly into the hopper in order to provide not only an agitation of the contents of the hopper, but also to provide a constant discharge of conveying pressure on the materials. Under the circumstances as indicated the screw conveyor may be made of any desired length, either to extend from within the hopper downwardly into substantial proximity to the discharge aperture, or to terminate at the entrance to the metering cup member 29, or the screw conveyor may be omitted entirely.

It will also be understood that the variable speed drive hereinabove mentioned proves highly essential and desirable in connection with the use of materials of varying consistencies or constituencies in the machine. Thus for example, as has been heretofore mentioned, it is intended that this machine be used with materials of varying viscosity. Not only may the screw flighting be changed, but also the utilization of the variable speed drive enables the better handling in a more accurate manner of the materials of varying viscosity. Similarly, one speed of driving is necessary, for example, in the utilization of meat as a filling for pies, whereas other speeds of drive are necessary in the utilization of fruits. Similarly speeds should be varied where the fruits are of different constituencies or sizes of dicing or cutting as may be desired in connection with the filling operation. It will thus be seen that the provision of the variable speed drive as hereinabove mentioned is highly desirable and provides a superior efficiency in the operation of the present invention.

It will further be understood that alterations and changes in the parts and elements herein may be made without departing from the spirit and scope of the invention, except as defined in the hereinafter claims.

We claim:

1. In a viscous liquid material dispensing mechanism, a hopper, a chute communicating at its upper end with and extending diagonally downwardly from said hopper, a housing communicated with the lower portion of said chute, said housing having a downwardly open discharge aperture, a cup member having an annular body open at one side interposed between said housing and said chute, said body telescoped within said housing and rotatable relative to said housing, said open cup member side facing toward said chute to receive material therefrom, shaft means connected to said cup member opposite to said cup member open side and extending through said housing, the annular body of said cup member including a plurality of ports extending through said body circumferentially equally spaced apart and successively moved as a result of cup member rotation into register with said housing aperture for release of material received from said chute, means for driving said shaft means to effect cut member rotation, said chute extending downwardly into said cup member into sliding engagement at its lower end with the interior of said annular body, screw conveyor means rotationally supported in said chute and extending throughout the majority of the length of said chute in parallelism with said chute from within said cup member upwardly into said hopper, and means for driving said screw conveyor to establish a pressure of material against the interior of said annular body whereby the material is forced outwardly when any of said ports are in register with said housing aperture.

2. In a viscous liquid material dispensing mechanism, a hopper, a chute communicating at its upper end with and extending diagonally downwardly from said hopper, a cylindrical housing communicated with the lower portion of said chute, said housing having a downwardly open discharge aperture, a cup member having an annular body open at one side interposed between said housing and said chute, said body telescoped within said housing and rotatable relative to said housing, said open cup member side facing toward said chute to receive material therefrom, shaft means connected to said cup member opposite to said cup member open side and extending through said housing, the annular body of said cup member including a plurality of ports extending through said body circumferentially equally spaced apart and successively moved as a result of cup member rotation into register with said housing aperture for release of material received from said chute, means for driving said shaft means to effect cup member rotation, and means for forcing the material through said chute and under pressure against the interior of said annular body whereby the material is forced outwardly under pressure when any of said ports are in register with said housing aperture.

3. In a viscous liquid material dispensing mechanism, a hopper, a chute communicating at its upper end with and extending diagonally downwardly from said hopper, a cylindrical housing communicated with the lower portion of said chute, said housing having a downwardly open discharge aperture, a cup member having an annular body open at one side interposed between said housing and said chute, said body telescoped within said housing and rotatable relative to said housing, said open cup member side facing toward said chute to receive material therefrom, shaft means connected to said cup member opposite to said cup member open side and extending through said housing, the annular body of said cup member including a plurality of ports extending through said body circumferentially equally spaced apart and successively moved as a result of cup member rotation into register with said housing aperture for release of material received from said chute, means for driving said shaft means to effect cup member rotation, said chute extending downwardly toward said cup member, screw conveyor means rotationally supported in said chute and extending in parallelism with said chute, and means for driving said screw conveyor to establish a pressure of material against the interior of said cup member whereby the material is forced outwardly when any of said ports are in register with said housing aperture.

4. In a viscous liquid material dispensing mechanism, a hopper, a chute communicating with the extending from said hopper, a housing communicated with one end of said chute, said housing having a downwardly open discharge aperture, a cup member having an annular body open at one side, said body telescoped within said housing and rotatably relative to said housing, said open cup member side facing toward said chute end to receive material therefrom, shaft means connected to said cup member opposite to said cup member open side and extending away from said housing, the annular body of said cup member including a plurality of ports extending through said body circumferentially equally spaced apart and successively moved as a result of cup member rotation into register with said housing aperture for release of material received from said chute, means for driving said shaft means to effect cup member rotation, said chute extending toward said cup member, screw conveyor means rotationally supported in and extending along said chute in parallelism with at least a portion of said chute, and means for driving said screw conveyor to move material from said hopper toward said chute end and into said housing and under pressure against the interior of said annular body whereby the material is forced outwardly under pressure when any of said ports are in register with said housing aperture.

5. In a viscous liquid material dispensing mechanism, a hopper, a chute communicating with and extending from said hopper, a housing communicated with one end of said chute, said housing having a downwardly open discharge aperture, a cup member having an annular body open at one side, said body telescoped within said housing and rotatable relative to said housing, said open cup member side facing toward said chute end to receive material therefrom, shaft means connected to said cup member opposite to said cup member open side and extending away from said housing, the annular body of said cup member including a plurality of ports extending through said body circumferentially equally spaced apart and successively moved as a result of cup member rotation into register with said housing aperture for release of material received from said chute, means for driving said shaft means to effect cup member rotation, said chute extending toward said cup member and means for forcing the material through said chute and under pressure against the interior of said annular body whereby the material is forced outwardly under pressure when any of said ports are in register with said housing aperture.

6. In a viscous liquid material dispensing mechanism, valving means for the material, means for supplying the material under pressure to said valving means, said valving means including means establishing a discharge aperture, means interposed between said discharge aperture and said material supplying means for completely confining the material whereby pressure of the material is allowed to build up, said means interposed between said discharge aperture and said material supplying means including a rotatable member having an annular body, said annular body being interposed between said discharge aperture and said material supplying means, means for rotating said annular body, said body being provided with at least one port therethrough movable upon rotation of said body into register at regular intervals with said discharge aperture for releasing pre-determined amounts of the material under pressure at regular intervals.

References Cited in the file of this patent

UNITED STATES PATENTS

| | | |
|---|---|---|
| 391,907 | Merrill | Oct. 30, 1888 |
| 1,320,678 | Edwards | Nov. 4, 1919 |
| 2,042,896 | Hofler et al. | June 2, 1936 |
| 2,321,838 | McBean | June 15, 1943 |
| 2,615,408 | Hylten-Cavallins | Oct. 28, 1952 |